United States Patent [19]
Antos et al.

[11] Patent Number: 5,296,012
[45] Date of Patent: Mar. 22, 1994

[54] METHOD OF MAKING OPTICAL WAVEGUIDE PREFORMS

[75] Inventors: A. Joseph Antos, Elmira, N.Y.; Michael G. Blankenship, Sebring, Fla.

[73] Assignee: Corning Incorporated, Corning, N.Y.

[21] Appl. No.: 997,204

[22] Filed: Dec. 28, 1992

[51] Int. Cl.⁵ ............................................. C03B 19/06
[52] U.S. Cl. ..................................... 65/3.12; 65/18.2
[58] Field of Search ..................... 65/3.12, 18.2, 3.11

[56] References Cited

U.S. PATENT DOCUMENTS

| | | | |
|---|---|---|---|
| 3,933,454 | 1/1976 | Deluca | 65/3.12 |
| 4,125,388 | 11/1978 | Powers | 65/3.12 |
| 4,314,837 | 2/1982 | Blankenship | 65/3.12 |
| 4,501,602 | 2/1985 | Miller et al. | 65/18.2 |
| 4,639,079 | 2/1987 | Powers . | |
| 4,826,288 | 5/1989 | Mansfield et al. . | |
| 4,923,279 | 5/1990 | Ainslie et al. . | |
| 5,043,002 | 8/1991 | Dobbins et al. | 65/3.12 |
| 5,078,092 | 1/1992 | Antos et al. | 65/3.12 X |
| 5,123,940 | 6/1992 | DiGiovanni et al. | 65/3.12 |
| 5,140,665 | 8/1992 | Backer et al. | 385/126 |
| 5,141,549 | 8/1992 | Trumminelli | 65/18.2 |

FOREIGN PATENT DOCUMENTS 0469795 2/1992 European Pat. Off. .

Primary Examiner—Robert L. Lindsay
Attorney, Agent, or Firm—B. E. Kamerer

[57] ABSTRACT

A vapor deposition method for making preforms from which optical waveguide fibers are drawn wherein at least a first precursor compound is oxidized at one oxidation site and at least a second precursor compound, which is different from the first precursor compound, is oxidized at a second oxidation site. The method is particularly applicable in cases where the first and second precursor compounds are chemically incompatible with one another or where the flow rate of the second precursor compound is substantially lower than the flow rate of the first precursor compound.

20 Claims, 2 Drawing Sheets

METHOD OF MAKING OPTICAL WAVEGUIDE PREFORMS

BACKGROUND OF THE INVENTION

The present invention relates to a method for making optical waveguide preforms from which optical waveguide fibers are drawn.

There are several well-known methods for making preforms from which optical waveguide fiber is drawn. These include outside vapor deposition (OVD), modified chemical vapor deposition (MCVD), vapor axial deposition (VAD), and plasma-enhanced chemical vapor deposition (PECVD).

Each of the above methods conventionally involve: i) delivery of a vapor flow containing glass forming precursors to an oxidation site such as, for example, the flame of a gas/oxygen burner or hot plasma zone adjacent to a deposition substrate or inside a deposition tube; ii) oxidation of the vapor flow to form a particulate or soot oxidation product; and, iii) collection of the particulate or soot oxidation product on the substrate or tube to form a preform. (In the PECVD process, the glass is deposited directly from the vapor phase onto the tube without the intermediate soot formation step.) The resulting soot preform, formed by the OVD and VAD methods, is then further processed, by sintering, to form clear glass from which an optical waveguide fiber is drawn. Preforms produced by MCVD and PECVD processes are generally clear after the deposition stage and can be drawn into fiber without a sintering step. Dopants may be included in the vapor flow to modify various characteristics of the resulting glass such as refractive index or coefficient of thermal expansion.

$SiO_2$-based optical waveguide fibers have long been commercially preferred. By providing a preform with a radially-varying refractive index profile, an optical waveguide fiber with the requisite waveguiding characteristics can be drawn therefrom. In order to provide the appropriate waveguiding characteristics, $SiO_2$ has been doped with various compounds to alter its refractive index. These compounds include, for example, $GeO_2$, $TiO_2$, and $P_2O_5$. Vapors containing these compounds are conventionally provided using metal halides such as $GeCl_4$, $TiCl_4$, and $POCl_3$. See, for example, Blankenship U.S. Pat. No. 4,314,837 (Blankenship '837).

It is also known that certain compounds, such as rare earth elements, can be incorporated into the glass structure to provide other optical-functions including lasing and signal amplification. See, for example, DiGiovanni et al., European Patent Application No. 0,469,795. It is also known that compounds containing these elements in readily vaporizable form are available, including the $\beta$-diketonate complexes. See, for example, Miller et al. U.S. Pat. No. 4,501,602. An exemplary material for supplying $ErO_2$ precursors is erbium heptafluoromethyloctanedione, $Er(fod)_3$.

Other methods of fabricating preforms containing rare earth dopants include sol-gel (see, for example, DiGiovanni et al. U.S. Pat. No. 5,123,940) and solution doping (see, for example, Ainslie et al. U.S. Pat. No. 4,923,279). These methods involve extra processing steps and provide poor control of the concentration of rare earth dopants in the resulting preform.

Prior methods of delivering the vapor flow to the oxidation site have included mixing the $SiO_2$, precursors with the dopant precursors before oxidation occurs. See, for example, Mansfield et al. U.S. Pat. No. 4,826,288 (MCVD process wherein the vapors containing rare earth compounds, aluminum compounds, and glass forming elements are mixed just prior to entry into the reaction-, i.e., oxidation-, zone); Tumminelli U.S. Pat. No. 5,141,549 (method for planar optical waveguide fabrication wherein vapors containing rare earth compounds, aluminum compounds and $SiO_2$ compounds are mixed at an oxidation burner to produce a uniform distribution of the rare earth and aluminum elements throughout the $SiO_2$ soot).

Powers U.S. Pat. No. 4,639,079 discloses a VAD method for producing an optical fiber preform in which the core region is laid down in conically shaped layers. The conically shaped layers comprise two sublayers. One sublayer has a high dopant concentration and the other sublayer has a low, or no, dopant concentration. These sublayers are produced by multiple burners which are traversing one portion of the preform so produced. Each burner contains at least $SiO_2$ precursors and also contains dopant precursors (for example, $GeO_2$) at different levels.

We have found, however, that the vapors containing rare earth compounds formed from $\beta$-diketonate complexes can be chemically incompatible with vapors formed from metal halides. Mixing of these chemically incompatible vapors prior to oxidation allows reactions to occur in the vapor stream. These vapor phase reactions can result in the formation of unwanted particulates in the vapor stream which can cause non-uniform deposition of the oxidation soot products as well as equipment problems such as plugging of burner orifices and contamination of subsequently manufactured preforms.

SUMMARY OF THE INVENTION

It is an object of the present invention to provide a vapor deposition method for producing a preform from which optical waveguide fiber is drawn wherein dopants are added to the base glass by oxidizing vapors containing the dopants separately from the oxidation of vapors containing the base glass precursors.

It is a further object of the present invention to provide a method wherein dopant concentrations less than 10,000 ppm, and in some cases, as low as 1 ppm, can be added to a preform accurately and repeatably.

Another object of the present invention is to provide a vapor deposition method for producing a preform from which optical waveguide fiber is drawn, wherein at least some of the vapors containing precursors of the various constituents in the preform are chemically incompatible with each other prior to oxidation.

Another object of the present invention is to provide a vapor deposition method for producing a preform from which optical waveguide fiber is drawn, wherein the oxidation conditions for the vapors containing precursors of the various constituents in the preform are optimized for the amount of reactants in the vapor streams.

The drawings are not drawn to scale, e.g., the burner separation distance.

DETAILED DESCRIPTION

Figure 1:
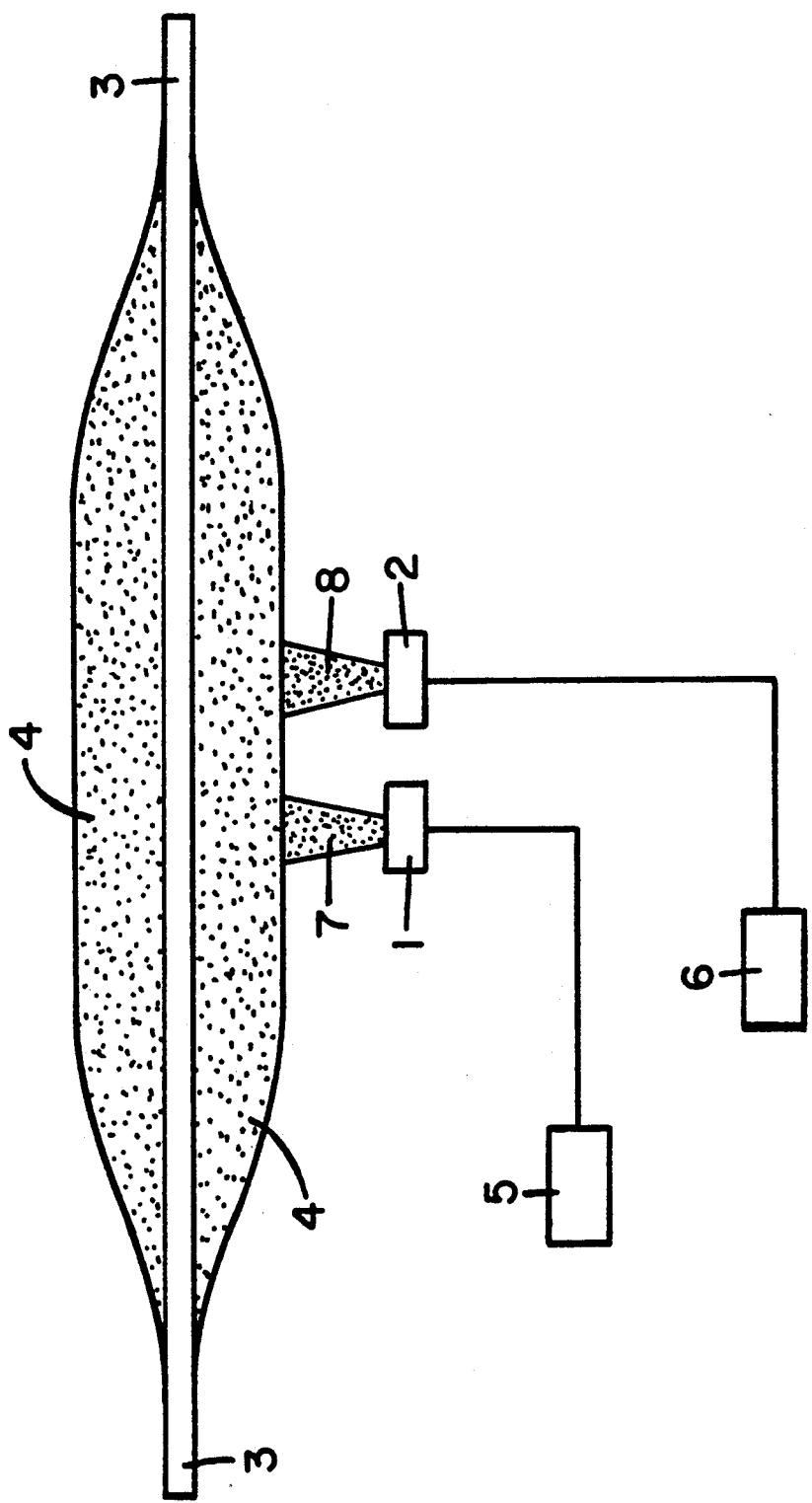
FIG. 1 is a schematic representation of a multiple burner OVD apparatus used in the method of this invention.

As shown in FIG. 1, burners 1 and 2 each direct a separate stream of particulate oxidation products toward a target mandrel 3. Mandrel 3 is rotated to allow deposition of the particulate oxidation products about its circumference. Relative axial movement between burners 1,2 and mandrel 3 results in deposition along the length of mandrel 3. Accumulation of particulate oxidation products on mandrel 3 results in accumulated soot 4.

The vapor delivery system is similar to that disclosed in Blankenship '837, the relevant portions of which are incorporated by reference. Vapors containing oxidation product precursors are delivered to burners 1 and 2 by separate systems indicated by delivery systems 5 and 6, respectively. Burner 1 is provided with $SiO_2$ precursor vapors. In a preferred embodiment, burner 1 is also supplied with $GeO_2$ precursor vapors. The sources of the vapors, the burner fuel and the oxygen, as well as the flow control systems and mixing elements are not shown. Any portions of the system which are exposed to the halide vapors are maintained at a temperature sufficient to prevent condensation of the vapors.

Figure 2:
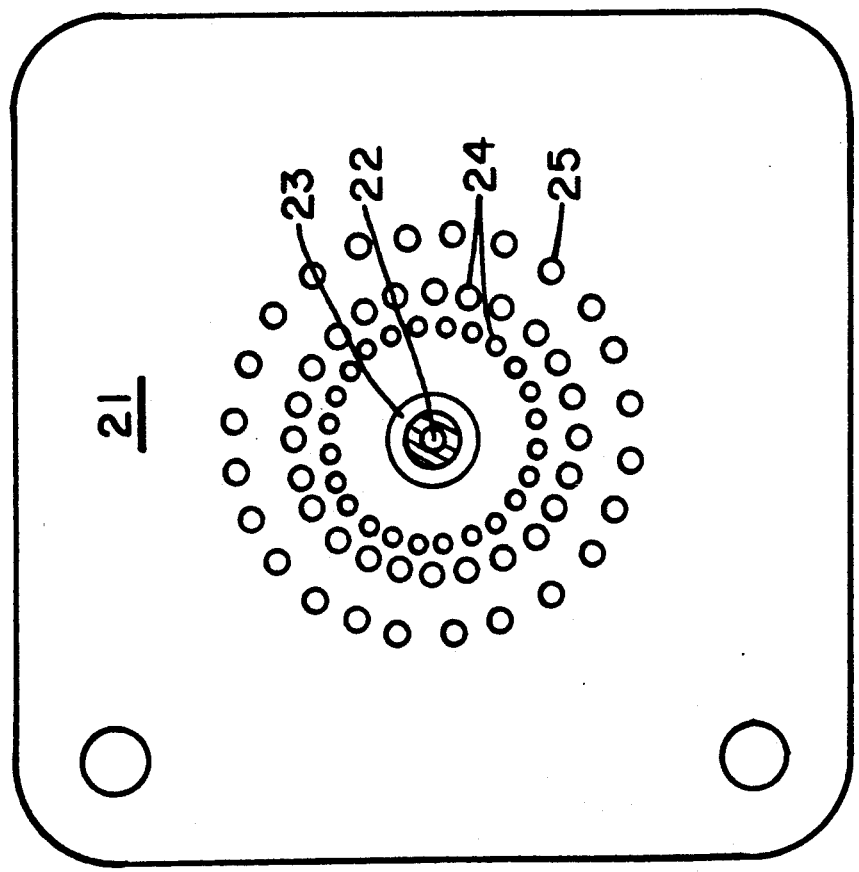

Burner 2 is supplied with vapors from a similar system as indicated by delivery system 6, although the constituents provided to burner 2 will comprise materials other than $SiO_2$, precursors. In appropriate cases, multiple dopant sources may be used to feed vapors to burner 2. Also, while FIG. 2 shows only two burners, more than two burners may be used, with at least one burner supplying an oxidation product or a different combination of oxidation products that is different from that supplied by at least one of the other burners.

As is shown in FIG. 1, particulate stream 8 from burner 2 contacts accumulated soot 4 at a point which is displaced from the point at which particulate stream 7 from burner 1 contacts accumulated soot 4. In other words, a pass of burner 1 will provide a layer of accumulated soot containing $SiO_2$ and any other constituents contained in particulate stream 7, and a pass of burner 2 will provide a layer of accumulated soot containing the constituents in particulate stream 8.

As the constituents in the two particulate streams are dissimilar, the alternating layers will not contain a homogeneous mixture of the various oxidation products. In the prior art discussed above, an objective has been to form a preform which contains a homogeneous mixture of the various oxides. We have found that, for very low levels of dopant concentrations, the inhomogeneity of the alternating layers does not adversely affect the optical properties of the resulting optical waveguide fiber. One reason for this may be that the soot layer deposited by burner 2 is generally much thinner that the soot layer deposited by burner 1 as the flow of dopants into burner 2 is significantly lower than the flow of $SiO_2$ precursors into burner 1.

Separation of the precursor vapors is also important when the flow of precursor vapors into burner 2 is significantly lower than the flow of precursor vapors into burner 1. This allows the flow of other burner gases (e.g., oxygen and fuel) to be optimized for the level of precursor vapors. This results in proper oxidation and more efficient deposition of each constituent.

The benefits derived from the separation of the precursor vapors include:

1. higher heat requirement for vapor transport lines only for those vapors which require it;
2. less condensation in vapor transport lines;
3. reduction of reaction between incompatible such as chlorides and organometallics which can form particulates in vapor transport lines and at the face of the burner;
4. more complete oxidation and higher deposition efficiencies of all dopants because oxidation conditions are optimized for all dopant reactions;
5. reduced contamination of vapor transport lines due to separation of vapor products (allowing for more flexibility when changing from one set of dopants to another); and,
6. the capability to readily produce dopant profiles of varying shapes.

It is also envisioned that the present invention is applicable in situations where the level of dopant concentration is significantly higher than 10,000 ppm. This would be the case when making a preform from which a conventional $SiO_2$-based singlemode optical waveguide fiber, which is doped with $GeO_2$ to create the requisite refractive index profile, is drawn. The inhomogeneous characteristic of the deposition by the method of the present invention would provide for sufficient control of the dopant profile in the resulting singlemode preform.

Another embodiment of the present invention maintains the separation of the precursor vapor streams until after oxidation but, in this embodiment, the soot streams are directed at substantially the same point on the target mandrel such that the soot streams interact with each other at or near the mandrel. It is believed that this embodiment provides for a more homogeneous mixture of the soot. It is also likely that this embodiment would result in a decrease in deposition efficiency because of the interaction of the soot streams. Also, there may be some detrimental effect on the ability to control the composition of the soot deposited in this manner.

The present invention is useful in applications where $SiO_2$—$GeO_2$ based optical waveguide fibers are doped with $ErO_2$ for use in fiber amplifier applications. The preferred precursor for $ErO_2$ is one of the $\beta$-diketonates. Vapors from the $\beta$-diketonate source are not compatible with the vapors generally used to provide the $SiO_2$ or $GeO_2$ and may cause particulate formation in the delivery system. Separation of the vapors is necessary to prevent such particulate formation.

In one embodiment of the present invention, the precursor for the $SiO_2$ is octamethylcyclotetrasiloxane (OMCTS) or a similar compound as disclosed in Dobbins et al. U.S. Pat. No. 5,043,002, and the precursor for $GeO_2$ is $GeCl_4$. These precursors are chemically incompatible with each other in the vapor phase and can form particulates in the vapor transport system if mixed together before oxidation. Therefore, it is desirable to keep the vapor streams separate until after oxidation. The multiple burner method of the present invention is particularly well-suited for this purpose. As discussed above, the method of the present invention also allows the oxidation conditions to be optimized separately for the flow rates of $SiO_2$, precursors to burner 1 and $GeO_2$ precursors to burner 2. Of course, dopant materials other than $GeO_2$ precursors could be delivered to burner 2.

The following specific examples are given as illustrations only and are not intended to limit the scope of the present invention. The reactant delivery system used in the following examples is similar to that disclosed in Blankenship '837. The burners are similar to those disclosed in Blankenship '837 and Backer et al. U.S. Pat. No. 5,140,665 and as illustrated in FIG. 2. FIG. 2 depicts burner face 21 with central fume tube 22, inner shield annulus 23, fuel premix orifices 24, and outer shield orifices 25. The dehydration and consolidation process used to convert the soot preform into clear glass is similar to that disclosed in DeLuca U.S. Pat. No. 3,933,454 and Powers U.S. Pat. No. 4,125,388.

EXAMPLE 1

A preform was made from which a discrete amplifier fiber was drawn. The fiber consisted of a $SiO_2$ core doped with $GeO_2$ to provide a refractive index delta of about 1.0% and a cladding of $SiO_2$ with a refractive index of about 1.453. The $GeO_2$-doped $SiO_2$ core also contained 300 ppm $ErO_2$. The resulting fiber achieved over 15 dBm of output power when pumped with 980 nm light over a length of 15 m.

The $SiO_2$ and $GeO_2$ precursors were delivered to burner 1 which was similar in design to the burner shown in FIG. 2. The sources for these vapors were $SiCl_4$ and $GeCl_4$, respectively. The vapors were mixed prior to introduction into the gas/oxygen flame of burner 1.

The $ErO_2$ precursor was delivered to burner 2 during core deposition only. In this example, burner 2 was also similar in design to the burner shown in FIG. 2. The source of the vapor was $Er(fod)_3$. Argon was bubbled through $Er(fod)_3$ at about 165° C. to deliver the vapor.

The deposition took place on a lathe in which a mandrel traversed back and forth in front of two stationary burners. The mandrel was rotated at about 168 rpm. The preform was traversed in front of the burners at a velocity of 23 mm/sec in one direction. The preform was returned to the start position at a velocity of 1282 mm/sec.

While two way deposition was used in this example, deposition in one direction only is optional. Deposition in one direction only can be achieved by moving the burners in one direction relative to the preform while the soot streams emanating from the burners impinge on the preform. When the entire axial length of the preform has been traversed by the burners, they can then be tilted such that the soot streams no longer impinge on the preform. The burners and preform can then be moved in relation to each other such that the burners are back at the starting position. The burners are then tilted once again such that the soot streams impinge on the preform, and the cycle is repeated as necessary to achieve the size preform desired. We have found that one way deposition of $ErO_2$ (and $Al_2O_3$, when included) by the method of the present invention is comparable to two way deposition.

EXAMPLE 2

Figure 3:
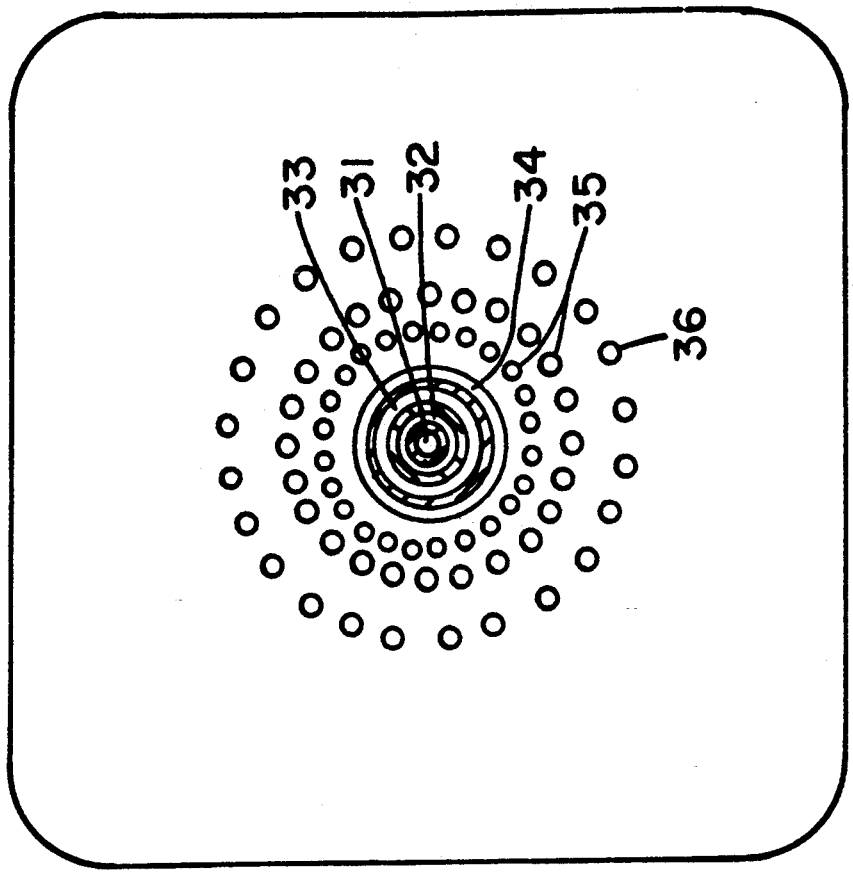
FIGS. 2 and 3 are representations of burners used in the method of this invention.

In another embodiment of the present invention, a preform was manufactured as described in Example 1, except that the design of burner 2 was slightly modified and $Al_2O_3$ was added to the preform. The resulting fiber consisted of a $SiO_2$ core doped with $GeO_2$ to provide a refractive index differential of about 1.0% and a cladding of $SiO_2$ with a refractive index of about 1.453. The $GeO_2$-doped core also contained about 300 ppm $ErO_2$ and about 0.8 wt. % $Al_2O_3$. As shown in FIG. 3, the burner design included three concentric fume tubes 31, 32, and 33. Inner fume tube 31 was used to deliver $ErO_2$ precursors to the oxidation site. Outer fume tube 33 was used to deliver $Al_2O_3$ precursors to the oxidation site. Middle fume tube 32 was used to provide an oxygen shield between inner fume tube 31 and outer fume tube 33. Inner shield annulus 34, fuel premix orifices 35 and outer shield orifices 36 are similar to those in FIG. 2.

The $SiO_2$, $GeO_2$, $ErO_2$, and $Al_2O_3$ precursors were $SiCl_4$, $GeCl_4$, $Er(fod)_3$, and $AlCl_3$, respectively. The $ErO_2$ and $Al_2O_3$ precursors were delivered to burner 2 during core deposition only. The $ErO_2$ precursor was delivered by bubbling argon through $Er(fod)_3$ at about 165° C. The $Al_2O_3$ precursor was delivered by bubbling oxygen through $AlCl_3$ at about 105° C.

EXAMPLE 3

A preform was made from which a distributed amplifier fiber was drawn. The fiber consisted of a $SiO_2$ core doped with $GeO_2$ to produce a dispersion-shifted profile with a segmented core as described in Bhagavatula U.S. Pat. No. 4,715,679. The inner core had a triangular shape and contained a maximum of about 20 wt. % $GeO_2$ for a maximum refractive index differential of about 1%, the depressed region of the core consisted of $SiO_2$, and the outer ring of the core contained about 6 wt. % $GeO_2$ for a refractive index differential of about 0.25%. The $GeO_2$-doped $SiO_2$ inner core also contained 1 ppm $ErO_2$ and 0.25 wt. % $Al_2O_3$. The cladding consisted of $SiO_2$ with a refractive index of about 1.453. The resulting fiber had a transparency power (the amount of pump power required to achieve no loss in the full length) of 0.5 mw/km.

The $SiO_2$ and $GeO_2$ precursors were delivered to burner 1. Burner 1 was similar to the design shown in FIG. 2. The sources of these vapors were $SiCl_4$ and $GeCl_4$, respectively.

The $ErO_2$ and $Al_2O_3$ precursors were delivered to burner 2 during core deposition only. The design of burner 2 was similar to the burner shown in FIG. 3. The sources of these vapors were $Er(fod)_3$ and $AlCl_3$, respectively. The $ErO_2$ precursor was delivered by bubbling argon through $Er(fod)_3$ at about 110° C. The $Al_2O_3$ precursor was delivered by bubbling oxygen through $AlCl_3$ at about 105° C.

The present invention has been particularly shown and described with reference to the preferred embodiments thereof. However, it will be understood by those skilled in the art that various changes may be made in the form and details of these embodiments without departing from the true spirit and scope of the invention as defined by the following claims. For example, although the present invention has been described herein primarily with reference to amplifier fibers, it is also applicable to other fiber applications and to the vapor deposition of preforms for planar optical waveguides. Also, although the present invention has been described by reference to $SiO_2$-based optical waveguide fibers, it is also applicable to optical waveguide fibers comprising other base glass compositions.

We claim:

1. A method for making a preform from which optical waveguide fiber is drawn, comprising
    a. generating a first vapor flow containing at least a first precursor,
    b. delivering said first vapor flow to a first oxidation site,
    c. oxidizing said first vapor flow to produce a first soot stream,
    d. directing said first soot stream toward a mandrel,
    e. collecting at least a portion of said first soot stream on said mandrel, f. generating a second vapor flow not containing said first precursor and containing at least a second precursor, g. directing said second vapor flow to a second oxidation site, h. oxidizing said second vapor flow to produce a second soot stream, i. directing said second soot stream toward said mandrel, and j. collecting at least a portion of said second soot stream on said mandrel.

2. The method of claim 1, wherein said at least a first precursor comprises a compound which forms $SiO_2$ after said first vapor flow is oxidized.

3. The method of claim 2, wherein said step of generating a first vapor flow further comprises using a metal halide to generate said first vapor flow.

4. The method of claim 2, wherein said step of generating a first vapor flow further comprises using an organometallic compound to generate said first vapor flow.

5. The method of claim 2, wherein said step of generating a first vapor flow further comprises generating $SiO_2$ and $GeO_2$ precursors and combining said precursors before delivering said first vapor flow to said first oxidation site.

6. The method of claim 1, wherein said second vapor flow contains precursors of at least one of: $GeO_2$, $TiO_2$, rare earth oxides, or other metal oxides.

7. The method of claim 6, wherein said step of generating a second vapor flow further comprises using a compound selected from the group of $\beta$-diketonate complexes.

8. The method of claim 1 further comprising generating at least a third vapor flow and oxidizing said at least a third vapor flow to produce at least a third soot stream.

9. The method of claim 1, wherein said first soot stream is directed toward a first point on said mandrel and said second soot stream is directed toward a second point on said mandrel displaced from said first point.

10. The method of claim 1, wherein said first and second soot streams are directed toward substantially the same point on said mandrel.

11. A method for making an optical fiber preform from at least a first precursor compound and a second precursor compound, said second precursor compound being different from said first precursor compound, wherein a first vapor flow containing at least said first precursor compound is isolated from a second vapor flow until said first and second vapor flows have been oxidized into first and second soot particle streams, respectively, and wherein said second vapor flow does not contain said first precursor compound and contains at least said second precursor compound.

12. The method of claim 11, wherein said first precursor compound forms $SiO_2$ after oxidizing said first vapor flow.

13. The method of claim 12, wherein said first vapor flow comprises a metal halide.

14. The method of claim 12, wherein said first vapor flow comprises an organometallic compound.

15. The method of claim 12, wherein said first vapor flow further comprises $SiO_2$ and $GeO_2$ precursor compounds.

16. The method of claim 11, wherein said second vapor flow contains precursors of at least one of: $GeO_2$, $TiO_2$, rare earth oxides, or other metal oxides.

17. The method of claim 16, wherein said second vapor flow is generated from a compound selected from the group of $\beta$-diketonate complexes.

18. The method of claim 11 further comprising at least a third vapor flow which is isolated from said first and second vapor flows until said first, second, and at least a third vapor flow have been oxidized to produce first, second and at least a third soot streams, respectively.

19. The method of claim 11, wherein said first soot stream is directed toward a first point on a mandrel and said second soot stream is directed toward a second point on said mandrel displaced from said first point.

20. The method of claim 11, wherein said first and second soot streams are directed toward substantially the same point on a mandrel.

* * * * *